United States Patent [19]

Prando et al.

[11] Patent Number: 5,300,315
[45] Date of Patent: Apr. 5, 1994

[54] ANTISTATIC COATING FOR CATHODE RAY TUBES

[75] Inventors: Gregory T. Prando, Chicago; Hua S. Tong, Arlington Heights, both of Ill.

[73] Assignee: Zenith Electronics Corporation, Glenview, Ill.

[21] Appl. No.: 995,870

[22] Filed: Dec. 23, 1992

[51] Int. Cl.$^5$ .............................. B05D 5/06
[52] U.S. Cl. ..................... 427/64; 427/162; 427/164; 427/165; 427/387; 427/389.7
[58] Field of Search ............ 427/64, 162, 389.7, 427/164, 165, 387

[56] References Cited

U.S. PATENT DOCUMENTS 4,532,185  7/1985  Balchunis et al. ............... 428/447
4,873,120  10/1989  Itou ................................. 427/64

Primary Examiner—Janyce Bell

[57] ABSTRACT

The present invention is directed to a cathode ray tube (CRT) having a surface with improved antistatic and antiglare properties and to a method for providing such improved properties. In the method of the invention, a solution of a silane and an epoxyalkylsilane in a solvent system comprising an alcohol, an acid and water is provided. The solution is applied to the surface of a cathode ray tube to impart antiglare and antistatic properties to the surface. Thereafter, the CRT with the silane applied is cured at an elevated temperature for a period of time sufficient to cause the silane to react and be converted to a siloxane.

18 Claims, No Drawings

ANTISTATIC COATING FOR CATHODE RAY TUBES

FIELD OF THE INVENTION

The present invention relates generally to a cathode ray tube (CRT) having a coating on the face panel thereof which provides improved antistatic properties at low humidities. More particularly, the present invention relates to a method for providing an antistatic and antiglare coating on the face panel of CRT's.

BACKGROUND OF THE INVENTION

Cathode ray tubes are increasingly being used as visual display terminals (VDT's) which are scanned at close range by the human eye. It is desirable to minimize the glare that is reflected from the glass surface of the CRT so as to enable the user to more easily read the graphics and other display characters that are shown on the screen.

Various methods are known for reducing the glare on CRT face panels. U.S. Pat. No. 4,945,282 to Kawamura describes a process for providing antistatic and antiglare properties to the surface of a CRT. The process involves applying a suspension of electroconductive metal oxide particles in an alcoholic solution of alkoxysilane onto the front surface of a CRT. This is followed by heat treatment to the resulting coat to form an antistatic film comprising a transparent electroconductive $SiO_2$ coat on the front surface. Antiglare properties are provided by applying a second non-glare film over the electroconductive $SiO_2$ coat. The formulation of the non-glare film includes the steps of dispersing fine $SiO_2$ particles in an alcoholic solution of alkoxysilane, applying the suspension over the antistatic film which is the transparent substrate formed on the panel and heating the resultant coat to decompose the alkoxysilane to form a thin $SiO_2$ film to thereby cover and fix the fine $SiO_2$ particles.

U.S. Pat. No. 4,563,612 to Deal, et al. describes a cathode ray tube having an antistatic, glare-reducing coating. The coating has a rough surface which is composed essentially of a silicate material and an inorganic metallic compound. The coating is applied by spraying a solution of a water soluble salt of one or more of a metal selected from platinum, tin, palladium and gold in a lithium stabilized silica sol onto the surface of the cathode ray tube. A solution of lithium, sodium and potassium silicate or an organic silicate, such as tetraethyl orthosilicate may be substituted for the lithium stabilized silica sol.

U.S. Pat. No. 4,582,761 to Liu discloses an aqueous dispersion of polyvinyl acetate for use as a coating on an electronic viewing screen to provide antiglare properties.

U.S. Pat. No. 3,689,312 to Long, et al. is directed to a method for producing a glare-reducing coating on the surface of a cathode ray tube. The method includes the steps of preparing a coating formulation consisting of a solution of a siliceous polymer and an organic polymer in a volatile organic liquid vehicle for the polymers. The solution is then sprayed onto the surface of a cathode ray tube to coat the surface. The cathode ray tube is then baked at a temperature of 100° C. to 200° C. to cure the coating.

A cathode ray tube having an antistatic film is disclosed in U.S. Pat. No. 4,785,227 to Matsuda, et al. The antistatic film is applied by dipping the cathode ray tube into a mixture of tetraethyl silicate, propanol and butanol containing a colloidal solution of metal particles.

It is known to apply a solution of tetrachlorosilane in an anhydrous alcohol to the surface of a CRT heated to 50° C. to 80° C. to reduce glare. The tube surface is then heated to a temperature up to 200° C. for 15–20 minutes to cause polymerization of the silane to a polysiloxane. In this method, the silane solution is sprayed onto the surface of the CRT in the form of discrete island droplets of the solution. A continuous film of the solution must be avoided to provide optimum antiglare properties.

It is also known to apply coatings of lithium silicate onto the surface of a CRT to provide antiglare properties.

While various prior art methods have been proposed for reducing gloss and providing antiglare properties to the surface of a CRT, such methods have not met with complete success. It is important that any coating provided on the surface of the CRT to reduce gloss does not impart undesirable side effects, such as the provision of a mottled or uneven surface. The diffusive reflectivity of the surface imparted by the coating should also not be substantially different than that of the uncoated CRT.

DESCRIPTION OF THE PREFERRED EMBODIMENT

The invention is useful in cathode ray tubes of various types including home entertainment and medium-resolution and high-resolution types for use in color monitors.

Generally in accordance with the present invention, a coating composition which is a solution of a mixture of a silane and an epoxyalkylsilane ester in a solvent system comprising an alcohol, an acid and water, is applied to the surface of a cathode ray tube (CRT) to impart antistatic and antiglare properties to the surface of the CRT. The CRT with the silane mixture applied is then cured at an elevated temperature to cause the silanes to react in the environment of the solution and to be converted to an adhering coating of a siloxane.

Any commercially available silane may be used in the method of the present invention. The silane preferably has a boiling point of less than about 60° C. and is preferably selected from the group consisting of tetraalkyl silanes, tetraaryl silanes and halogenated silanes. Suitable silanes include tetrachlorosilane, tetramethoxysilane, tetraethoxysilane and trichlorosilane. The silane is preferably present in the solution at a level of from about 0.5 percent to about 10 percent by weight.

The epoxyalkylsilane esters may be alicyclic or acyclic. Suitable epoxyalkyl esters are described in a brochure of Union Carbide entitled "Organofunctional Silanes—A Profile" and are commercially available. The use of such silanes is disclosed in U.S. Pat. No. 4,532,185 to Balchunis. Suitable epoxyalkoxysilane esters are β-(3,4-epoxycyclohexyl)-ethyltrimethoxysilane (BEETM), which has the structure:

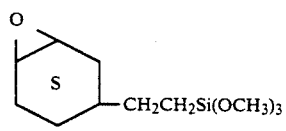

and gamma-glycidoxypropyltrimethoxysilane (GDPMS), which has the structure:

The oxirane group of the epoxyalkylsilane esters is reactive with all three components of the solvent system. For example, GDPMS, undergoes the following reactions:

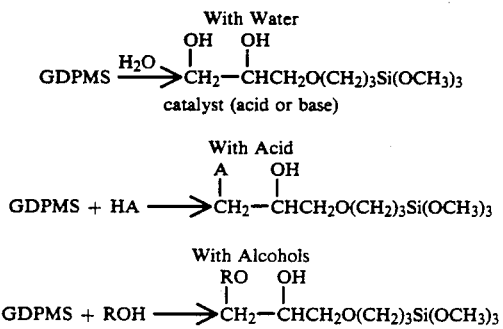

While not wishing to be bound by any theory, it is believed that the provision of a solvent system having a mixture of reactive components with the oxirane group of the epoxyalkylsilane ester results in a mixture of reacted components which establish the improved antistatic performance of the coating of the present invention at low humidity. Some improvement in antiglare performance is also attained, but not to the extent of the improved antistatic performance.

The epoxyalkylsilane ester is present in the solution at a low but effective level of from about 0.05% to about 1.0%. All percentages herein are by weight, based on the weight of the solution, unless otherwise indicated.

The acid is preferably selected from hydrochloric acid, sulfuric acid and mixtures thereof. In an important embodiment of the invention, chloride ion is provided by adding hydrochloric acid to the alcohol. The presence of chloride ion further enhances the antistatic properties of the coating solution. The chloride ion is present in the solvent system at a level of from about 0.01 to about 1.3 mols of chloride ion per 100 grams of solution. A suitable level of chloride ion can be provided using concentrated hydrochloric acid at a level of from about 1% to about 15%. Sulfuric acid may be present in combination with hydrochloric acid at a low, but significant amount, preferably in the range of from about 0.1% to 1%.

The silane is preferably present in the solution at a level of from about 0.5 percent to about 10 percent by weight, based on the weight of the solution.

The amount of water in the solvent system is from about 5% to about 75%. While the water can be present in the solvent system for silanes at a level of up to about 75%, best results in terms of solution stability, gloss reduction and diffusive reflectance are obtained when the water is present at a level of from about 5% to about 25%.

The alcohol for use in the solvent system of the present invention is an aliphatic $C_1$-$C_4$ alcohol. Preferred alcohols are selected from the group consisting of ethanol, propanol and butanol. A particularly preferred alcohol is ethanol. The alcohol is present at a quantity sufficient to provide the balance of the solution to 100 weight percent.

A further enhancement of the coating composition is attained through the addition of a saturated hydrocarbon to the solution.

The saturated hydrocarbons useful in the compositions of the present invention are selected from saturated paraffinic, straight chain hydrocarbons of the formula $C_nH_{2n+2}$ and saturated napthenic and cyclic hydrocarbons of the formula $C_nH_{2n}$ and mixtures thereof where n is an integer from 8 to 16. For reasons of cost and availability, a preferred saturated hydrocarbon is selected from kerosene and jet fuel which are products obtained from the refining of crude oil. Kerosene and jet fuel are primarily mixtures of $C_{10}$-$C_{14}$ paraffinic and napthenic components.

The saturated hydrocarbons are present in the coating compositions of the present invention at a level from about 0.1% to about 10%. The use of saturated hydrocarbons provides a noticeable effect on the reduction of gloss at very low levels. A preferred level of use of the saturated hydrocarbons is from about 0.2% to about 1%. At levels above about 1%, a milky appearance begins to form on the surface of the cathode ray tube. While further levels of gloss reduction can be obtained at saturated hydrocarbon levels above 1%, the reflectance profile and physical appearance may not be suitable.

The silane solution is applied to the surface of the cathode ray tube by any suitable method, such as by spraying a fine mist of the solution onto the surface or dip coating. The surface of the cathode ray tube is preheated prior to the application of the solution to initiate the chemical reaction, which will form silane particles on the surface of panels. The preheated surface also helps to evaporate the alcohol and water and prevents running of the solution. The surface of the cathode ray tube is preferably preheated to a temperature of from about 90° C. to about 120° C.

After the solution of silane is applied, the cathode ray tube may be cured at an elevated temperature for a period of time sufficient to convert the silane to siloxane. Suitable temperature and time conditions are a temperature of from about 120° C. to about 200° C. for a period of from about 0.1 hour to about 2 hours. Curing at an elevated temperature is not essential and curing may be effected at ambient temperature.

The following examples further illustrate various features of the present invention, but are intended to in no way limit the scope of the invention which is defined in the appended claims.

EXAMPLE 1

Three samples of a solution of a mixture of TES and GDPMS were prepared having the following components at the indicated levels.

| Component | Weight Percent |
| --- | --- |
| Tetraethoxysilane (TES) | 3 |
| HCl | 6 |
| Water | 20 |
| Kerosene | 0.5 |
| Sulfuric acid | 0.25 |
| Gamma-glycidoxypropyl-trimethoxysilane (GDPMS) | 0.05, 0.1, 0.2 |
| Ethanol | difference |

A CRT was cleaned by buffing with a buffing compound, which is a uniform paste having 1 part by weight of cerium oxide having a particle size in the range of 3 to 12 microns, 1 part by weight of Syloid 244 (Davidson), 1 part by weight mineral spirits, 1 part by weight methylene chloride and 1 part by weight xylene. This is followed by rinsing with tap water, cleaning with a commercial glass detergent (Windex ™ manufactured by Drackett Products Co., Cincinnati, Ohio), rinsing again with tap water and drying by directing a stream of compressed air over the surface of the CRT.

The above silane mixture solution were sprayed onto the panel surface of a cleaned cathode ray tube which had been preheated to a temperature of 90° C. The solvent and water were flashed from the surface of the face panel to provide a coating of silane. Spraying was accomplished by use of a compressed air spray gun having a nozzle orifice of 0.07 cm, and operated at an air pressure of 50 psig and a fluid pressure of 10 psig. The spray gun was moved back and forth over the surface of the CRT from a distance of 21 cm. Five passes of the spray gun were used to deposit a coating of 0.5 mg of silane per cm² of surface area. The cathode ray tubes were then cured at a temperature of 200° C. for a period of twenty minutes. The resulting coating was a thin layer of silicon oxide. The gloss reduction of the face panel without coating was 92%. After coating with the coating composition of the invention, the gloss reduction was 75%.

It can readily be seen that the silane coating of the invention provides exceptional antistatic properties.

EXAMPLE 2

The three cathode ray tubes of Example 1 were subjected to a simulated environmental test which consisted of subjecting the cathode ray tubes to the following schedule of temperatures and relative humidity conditions:

| Time | Temperature | Relative Humidity |
| --- | --- | --- |
| ½ hour to | 122° F. | 95% |
| 24 hours at | 122° F. | 95% |
| 1 hour to | 68° F. | 50% |
| 4 hours at | 68° F. | 50% |
| 1 hour to | 167° F. | 80% |
| 4 hours at | 167° F. | 80% |
| 1 hour to | 167° F. | 50% |
| 16 hours at | 167° F. | 50% |
| 1 hour to | 25° F. | 30% |
| Hold at | 25° F. | 30% |

The static discharge times required to reach 500 v before and after the environmental cycle are set forth below.

| Sample No. | Before Cycle | After Cycle |
| --- | --- | --- |
| 1 | 1.6 sec | 376 sec |
| 2 | 1.9 sec | 195 sec |
| 3 | 2.7 sec | 142 sec |

The static discharge times, even after the environmental cycle, are well within the 20 minute industry specification.

EXAMPLE 3

Additional coating composition solutions having the following compositions were prepared:

| Sample | TES | GDPMS | HCl | Kerosene | H$_2$O | H$_2$SO$_4$ | EtOH |
| --- | --- | --- | --- | --- | --- | --- | --- |
| 11A | 3.0% | .15 | 6% | 0.5% | 20% | 0.25% | Bal* |
| 13A | 3.0% | .20 | 6% | 0.5% | 20% | 0.25% | |
| 17A | 3.0% | .10 | 6% | 0.25% | 20% | 0.25% | |
| 19A | 3.0% | .10 | 6% | 0.12% | 20% | 0.25% | |
| 21A | 3.0% | .10 | 6% | <0.1% | 20% | 0.25% | |
| 25A | 3.0% | .10 | 6% | <0.1% | 20% | 0.25% | |

*Bal = Balance

The solutions were sprayed onto the surface of cathode ray tubes to provide a coating on the surface of the tubes.

The cathode ray tubes were subjected to a simulated environmental test as described in Example 2. The static discharge times to reach 500 v before and after the environment cycle are set forth below:

| Sample | Before cycle | After cycle |
| --- | --- | --- |
| 11A | <1 sec. | 8.2 sec. |
| 13A | <1 sec. | 9.6 sec. |
| 17A | 1.2 sec. | 31 sec. |
| 19A | <1 sec. | 2.4 sec. |
| 21A | <1 sec. | 1.7 sec. |
| 25A | <1 sec. | 1.0 sec. |

What is claimed is:

1. A method for improving the antistatic and antiglare properties of the surface of a cathode ray tube comprising:
   (a) providing a solution of a mixture of a silane and an epoxyalkylsilane ester in a solvent system comprising an alcohol, an acid and water, said silane being selected from the group consisting of tetralkyl silanes, tetraaryl silanes and halogenated silanes,
   (b) applying said solution onto the surface of a cathode ray tube, and
   (c) curing said silane on said cathode ray tube in a curing step for a period of time sufficient to convert said silane to a siloxane on the surface of said cathode ray tube.

2. A method in accordance with claim 1 wherein said silane is present in said solution at a level of from about 0.5% to 10%.

3. A method in accordance with claim 1 wherein said silane is selected from the group consisting of tetramethoxysilane, tetraethoxysilane, tetrachlorosilane and trichlorosilane.

4. A method in accordance with claim 1 wherein said epoxyalkylsilane ester is present at a level of from about 0.05% to about 1.0% based on the weight of said solution.

5. A method in accordance with claim 1 wherein said epoxyalkylsilane ester is selected from the group consisting of β-(3,4-epoxycyclohexyl)ethyltrimethoxysilane and gamma-glycidoxypropyltrimethoxysilane.

6. A method in accordance with claim 1 wherein hydrochloric acid is present in said solution at a level sufficient to provide from about 0.01 to about 1.3 mols of chloride ion per 100 grams of solution.

7. A method in accordance with claim 1 wherein said alcohol is a C$_1$–C$_4$ aliphatic alcohol.

8. A method in accordance with claim 1 wherein said alcohol is ethanol.

9. A method in accordance with claim 1 wherein a saturated hydrocarbon is present in said solution.

10. A method in accordance with claim 9 wherein said saturated hydrocarbon is selected from the group consisting of saturated straight chain paraffinic hydrocarbons having the formula $C_nH_{2n+2}$ and saturated cyclic napthenic hydrocarbons having the formula $C_nH_{2n}$.

11. A method in accordance with claim 10 wherein n is an integer of from 8 to 16.

12. A method in accordance with claim 9 wherein said saturated hydrocarbon is selected from kerosene, jet fuel and mixtures thereof.

13. A method in accordance with claim 9 wherein said saturated hydrocarbon is present in said solution at a level of from about 0.1% to about 10%.

14. A method in accordance with claim 1 wherein said acid is hydrochloric acid.

15. A method in accordance with claim 13 wherein said hydrochloric acid is present at a level sufficient to provide from about 0.01 to about 1.3 mols of chloride ion.

16. A method in accordance with claim 1 wherein sulfuric acid is present in said solution at a level of from about 0.1% to about 1%.

17. A method in accordance with claim 1 wherein said water is present at a level of from about 5% to about 75%.

18. A method in accordance with claim 1 wherein tetraethoxysilane is present in said solution at a level of from about 0.5% to about 10%, gamma-glycidoxypropyltrimethoxysilane is present at a level of from about 0.05% to about 1.0%, a saturated hydrocarbon is present at a level of from about 0.1% to about 10%, water is present at a level of from about 5% to about 75%, concentrated hydrochloric acid is present at a level of from about 1% to about 15%, sulfuric acid is present at a level of from about 0.1% to about 1% and said alcohol provides the balance of said solution.

* * * * *